May 17, 1960 — W. L. HYDE ET AL — 2,936,673
POLARIZING OPTICAL SYSTEMS
Filed Jan. 24, 1956 — 3 Sheets-Sheet 1

INVENTORS
WALTER LEWIS HYDE
SHINYA INOUÉ
BY
ATTORNEYS

May 17, 1960

W. L. HYDE ET AL 2,936,673

POLARIZING OPTICAL SYSTEMS

Filed Jan. 24, 1956

INVENTORS
WALTER LEWIS HYDE
SHINYA INOUÉ
BY
ATTORNEYS

2,936,673

POLARIZING OPTICAL SYSTEMS

Walter Lewis Hyde, East Woodstock, Conn., and Shinya Inoue, Rochester, N.Y., assignors to American Optical Company, Southbridge, Mass., a voluntary association of Massachusetts Application January 24, 1956, Serial No. 561,045

18 Claims. (Cl. 88—39)

This invention relates to polarizing microscopes and like optical instruments, and more particularly to polarizing optical instruments provided with improved means for increasing the optical sensitivity or optical resolution thereof.

In the field of polarizing microscopy, it is known that the surfaces of the condenser, specimen slide and objective lens elements being employed between the usual polarizer and analyzer of a polarizing microscope system act in varying degrees in accordance with the obliquity of the light passing therethrough as partial polarizers and lower the extinction coefficient of the system by tending to depolarize the light at the image plane of the objective. This defect may conveniently be examined at the rear focal plane or back aperture of the objective. If the analyzer is set perpendicularly to the polarizer, four light areas will be seen separated by a dark cross. Accordingly, heretofore complete extinction neither at the back aperture of the objective or at the image plane of the objective of all of the light being transmitted by the polarizer could be obtained by the analyzer in crossed relation thereto. This has been the case even though utmost care has been exercised to use strain-free optics in the condenser and in the objective, to use high quality polarizers and analyzers, and even to use substantially monochromatic light of a carefully selected wavelength. When the lenses of the system are completely strain-free, the polarization pattern is a perfectly symmetrical cross. When the analyzer is rotated, the cross opens up into two dark V's in opposite quadrants and these move out symmetrically toward the edge of the field as rotation continues. Rotation in the opposite direction produces V's in the other two opposing quadrants. It is clear from this observation that the light is still plane polarized but has effectively been rotated by various amounts. The degree of rotation thus varies with the numerical aperture of the system and the azimuth angle relative to the polarizer, and the sense of rotation is reversed in adjacent quadrants. Every point in the image plane of the objective, however, receives rays from all parts of the back aperture of the objective, and the result appears not as rotation, but as plane polarized light to which a small amount of unpolarized light has been added. For this reason, the term "depolarization" has been used when describing the defect of the light in the image plane, and "rotation" used when describing the defect of the light in the back aperture or rear focal plane of the objective.

The more steeply sloped the unit surface areas of the transmitting optical elements of a system are in relation to light incident thereon, the greater will be their depolarizing effect. Thus, even flat surfaces of transmitting elements of the system, such as a microscope slide and cover glass, having parts thereof receiving light obliquely and at high angles of incidence will likewise contribute to this depolarizing effect. Because the rotatory effect is of the same rotatory sense in both the condenser and objective, it cannot be reduced by the simple expedient of adding lenses to either. Also while at each lens surface it may be small, nevertheless, it is an accumulative condition and becomes quite material and objectionable when a number of refracting surfaces are to be jointly considered; such as is the situation in the case of an ordinary high quality polarizing microscope.

It has been previously proposed to provide low reflecting coatings of controlled thicknesses and proper refractive index on the surfaces of various or all of the light-transmitting elements of such an instrument in an endeavor to lessen this depolarizing effect in the image. Refracting surfaces receiving light obliquely at various angles of incidence thereto act as partial polarizers and provide unequal transmission coefficients for the light vibrating in the plane of incidence and for the light vibrating in a plane normal to this plane. Accordingly, rotation arises from differential reflection losses of the components polarized in the plane of incidence and plane perpendicular thereto. While improved results have been obtained in systems using such coatings to reduce reflection losses, the fact still remains that some depolarized light nevertheless gets through to the image plane of the objective and, of course, this stray light tends to reduce the sensitivity or degree of resolution which might otherwise be obtained. The result of such conditions has been, accordingly, that in order to keep the field dark, the microscope has been used at greatly reduced numerical aperture, with the result that its resolving power has also been reduced.

It has been found, however, that marked improvement in the sensitivity or resolving power of a polarizing microscope, or the like, over the best results previously obtainable can be had by following the teaching of the present invention, wherein by the use of correlated optical means in a polarizing optical system, it is possible to obtain substantially complete extinction of all of the light at the back aperture of the objective of the microscope even at relatively high numeral apertures, and thus possible to resolve details of minute objects of weak birefringence in a manner or degree never before obtainable.

In order to get such improved results, phase altering means of predetermined optical characteristics providing a one-half wave retardation and rotation compensation means of the proper value or values are added to the system. The phase altering means is preferably made in the form of a birefringent half-wave plate and is positioned preferably in parallel light, or nearly parallel light, in the system, between the polarizer and analyzer thereof and although this plate will operate with improved results at slightly different positions of angular adjustment or orientation in the intercepted beam of the instrument, it is preferably arranged with its slow axis or fast axis disposed in substantially parallel relation to the plane of polarization of the polarizer. This plate will then have the effect, when so positioned, of changing the sense, but not the magnitude, of the rotation of the plane of polarization of the light rays incident thereon; and to work therewith rotation compensation means of a carefully controlled value or values is provided.

The result of such a construction and arrangement of parts in the polarizing optical system of the present invention is that while the sloping lens surfaces, etc., of the optical elements of the system together, or a certain group of these elements together, tend to cause a definite amount of rotation of the light beam passing therethrough, the half-wave phase retardation means, will serve to reverse the sense of this rotation, and, accordingly, when a certain other group of these lens elements or suitable rotation compensation means of proper predetermined value is also used in the optical system and arranged to contribute an amount of rotation which is just sufficient to offset the inherent rotation resulting from the refracting surfaces ahead of the half wave phase retardation means, a balanced condition will be obtained. The rotation provided by the rotation compensation means or the like rearwardly of the half wave phase retardation means will, in effect, cancel out the rotation introduced by the lens and other refracting surfaces of the system ahead of the half wave phase retardation means; and thus the whole back aperture of the objective of the system will appear entirely dark at high or even very high numerical apertures.

It is, accordingly, an object of the present invention to provide a polarizing microscope, or the like optical instrument, having improved optical means embodying half wave phase retardation and rotation compensation components of predetermined optical characteristics and in proper arrangement therein, whereby a substantially complete extinction of light at the image plane of the objective of the system may be obtained; with the result that even minute weakly birefringent objects in the field of view of the microscope, or like optical instrument, will be more readily distinguishable against a more completely dark background than has been possible heretofore.

It is an additional object of the present invention to provide improved means in the form of half wave phase retardation and rotation compensation elements or components of predetermined optical and physical characteristics for use in a polarizing optical system in such a manner that substantially complete extinction of light may be provided at the image plane of the system while details of minute weakly birefringent objects within the field of view of the instrument will be more readily distinguishable.

Since the number, size and other physical characteristics of the elements and components of an optical system, as well as their ease or difficulty of manufacture and assembly, are material factors insofar as the cost of an optical instrument is concerned and since the overall size or compactness, stability and ease of operation also have a direct bearing upon the saleability of the completed instrument, it is an additional object of the invention to provide an improved polarizing microscope optical system, or the like, including improved light-modifying means of predetermined optical characteristics for obtaining very high image resolution and which means may be made in a relatively easy and inexpensive manner and incorporated into the optical system of the instrument without materially increasing the size thereof.

It is an additional object of the present invention to provide an improved polarizing microscope optical system, or the like, providing high image resolution and including compact and easy-to-make optical means of carefully controlled optical characteristics embodying rotation compensation means and half wave phase retardation means which are carefully predetermined so as to provide substantially complete extinction of background light at the image plane of the objective of said system so that image details of minute weakly birefringent objects in the object field of the system will be more readily distinguishable.

It is, also, an object of the present invention to provide compact, efficient, and inexpensive improved unitary light-modifying means including rotation compensation means and half wave phase retardation means of carefully controlled predetermined optical and physical characteristics for use in a conventional polarizing microscope or the like optical instrument, and which improved means is of such characteristics that substantially complete extinction of light at the image plane of the objective of the optical system in which the unitary means is being used may be obtained; with the result that details of weakly birefringent objects in the object field of the instrument will be more clearly resolved and more readily distinguishable than heretofore.

It is a further object of the present invention to provide improved sense changing and rotation compensation means which may be readily added to a polarizing microscope optical system or the like of known construction and thereby provide for such a system a relatively high degree of sensitivity at relatively high numerical apertures.

Other objects and advantages of the present invention will become apparent from the detailed description which follows when taken in conjunction with the present drawing in which.

Figure 1:
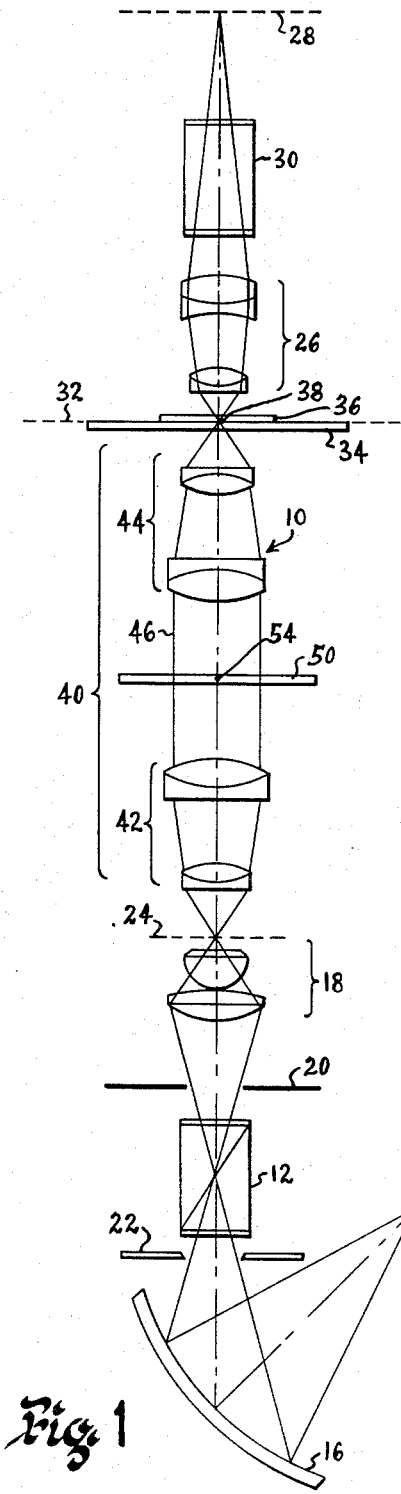
Fig. 1 is a schematic view of a polarizing microscope optical system or the like employing improved half wave phase retardation and rotation compensation means of the present invention.

Referring to the drawing in detail and in particular to Fig. 1, it will be seen that a polarizing microscope optical system is indicated generally by the numeral 10 and this system comprises a polarizing prism 12 arranged to receive a light beam from a high intensity light source 14 after same has been reflected and condensed by a concave reflector 16 arranged in optical alignment therewith. (Satisfactory results have been obtained using a water-cooled high pressure mercury vapor lamp. However, other sources could be used.) While a Glan-Thompson prism is preferred as the polarizer 12, other known forms of polarizing prisms such as an Ahrens prism, a Nicol prism or even sheet polarizing material may be used satisfactorily.

Above and below the polarizing prism 12, upper and lower iris diaphragms 20 and 22, respectively, are provided for controlling the light beam passing through the system. Optically aligned with the reflector 16 and polarizer 12 is a first compound achromatic condenser 18. This condenser 18 serves to collect polarized light from the prism 12 and to direct same as an illumination beam toward a first focal plane 24. While a conventional polarizing microscope system would normally have between this focal plane 24 and the image plane for the system an objective and an analyzer, a different construction and arrangement of parts is provided in the improved system of the present invention.

In the improved system 10, there is provided in spaced optically aligned relation to the first condenser 18, an achromatic objective 26 and between this objective and an image plane 28 thereof is located an analyzer 30. However, it will be noted that the objective 26 is arranged to focus at an object plane 32 spaced from the first focal plane 24, and, for illustration purposes, a conventional microscope slide 34 and cover glass 36, enclosing an object or specimen 38 for observation and study, have been shown adjacent this object plane.

In the present embodiment of the improved system, there is shown between the first focal plane 24 and the object plane 32 what may be termed a relay lens system 40, comprising a first auxiliary strain-free lens system 42 and a second auxiliary strain-free lens system 44. The first auxiliary lens system 42 may be considered the equivalent of an objective and is positioned in the system so as to focus substantially at the focal plane 24. It receives the polarized illumination beam from the condenser 18 and forms same into a beam of parallel light as indicated at 46. The second auxiliary lens system 44 (which may be considered the equivalent of a second condenser, but which is, in fact, of substantially the same optical design as the auxiliary lens system 42) is disposed in the microscope system in a reversed optically aligned manner to the lens system 42.

Accordingly, the second auxiliary lens system 44 will function in such a way as to receive the parallel light of beam 46 and direct same as an illumination beam toward the object or specimen 38 on slide 34 and at the object plane 32. Thus, in different language, it might be said that the relay system 40 is, in effect, a unit power telescope of high quality optical design. In the manner just described, the illumination being provided at focal plane 24 is transferred to object plane 32.

In the parallel beam 46 of polarized light is disposed additional optical means in the form of a phase altering component 50 of carefully controlled optical characteristics so as to provide a one-half wave phase retardation. This particular phase altering component may be termed a half-wave plate and is made of sufficient size to completely intercept the beam 46. Also, it is formed of birefringent material and is of such optical thickness as to differentially retard one of the ordinary and extraordinary rays of the light, preferably substantially monochromatic light, being transmitted thereby by one-half wavelength with respect to the other. Thus, one ray will be one-half a wavelength farther behind the other ray as same leave the plate 50 than they were when they entered the plate. While the phase relation between the ordinary and extraordinary ray is thus changed, there will be no material change in the amplitudes thereof. Such a plate may be formed of quartz, mica or equivalent birefringent material.

As stated previously, since each inclined refracting surface acts to some extent as a partial polarizer to light at other than normal incidence thereon, such surfaces will jointly tend to rotate the plane of polarization an objectionable amount. The results of such an accumulative condition in the field or back focal plane of an ordinary well corrected polarizing microscope using a 43X objective and a condenser, and operating at a numerical aperture of .84 have been schematically represented in Fig. 2 of the drawing, and a consideration of this figure and Fig. 3 together will aid one in obtaining a better understanding of the present invention.

Figure 2:
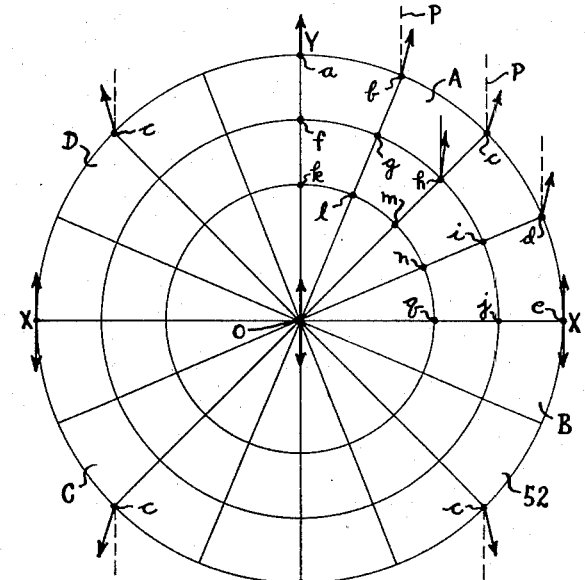
Fig. 2 is a schematic view showing polarizing conditions at the back focal plane of a conventional polarizing microscope.

In Fig. 2, the image field is indicated generally by the numeral 52. This field, for convenience of the discussion, has been subdivided not only into four quadrants A, B, C and D by abscissa X—X and ordinate Y—Y but also by a first circle located half-way from the center 0 to the periphery of the field, by a second circle located three-fourths of this distance and by radial lines dividing each quadrant into four equal sectors.

Accordingly, if different points of intersection of these lines and circles of quadrant A in Fig. 2 are measured for amounts (in degrees) of depolarization ordinarily encountered in a polarizing microscope of high optical performance, it will be found that these points possess approximately the following rotation of the plane of polarization expressed in degrees:

$a=0$
$b=+6.4$
$c=+9.6$
$d=+6.4$
$e=0$
$f=0$
$g=+2.1$
$h=+3.0$
$i=+2.1$
$j=0$
$k=0$
$l=+0.6$
$m=+1.0$
$n=+0.6$
$q=0$

Arrows extending from certain significant ones of these intersection points have been shown to indicate, in somewhat exaggerated fashion, the direction of rotation from the plane of polarization indicated by the dotted lines P.

The other quadrants B, C and D of Fig. 2 in like manner will manifest equivalent amounts of depolarization. Only the sign of the rotation in the different quadrants is different. For example, point $c$ in quadrant B, as in quadrant A, is equal to 9.6 degrees but its sign will be negative. Point $c$ in quadrant C will be of the same numerical value but will be positive and point $c$ in quadrant D will be equal to 9.6 but of negative sign.

From a glance at the above values for the image field 52 in Fig. 2, it will be appreciated that the worst conditions of depolarization in each quadrant occurs midway between the X—X and Y—Y axes and at points nearer the outer edge of the field. The best conditions are along these axes.

Of course, the conventional instrument contributing the field 52 in Fig. 2, could not possibly be used satisfactorily at a numerical aperture approaching 0.84. It follows, therefore, that this was the primary reason why microscopists heretofore have been required to "stop down" their optical systems in order to obtain more complete freedom from such depolarizing effects while trying to better see details of small and weakly birefringent objects. And, of course, on the other hand, the stopping down of the optical system greatly reduced the overall resolving power of the instrument.

Figure 3:
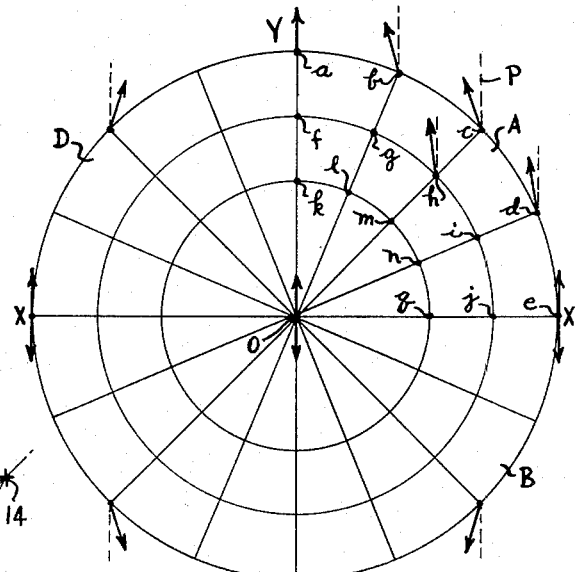
Fig. 3 is a schematic view showing polarization conditions at the back focal plane of such a system modified in accordance with the present invention.

It has been found, however, that if phase retardation means like the half-way plate indicated at 50 in Fig. 1 is inserted with its axis substantially parallel to the X—X or Y—Y axis and in nearly parallel light between the polarizer and analyzer of the conventional polarizing microscope system, it will not correct the above-mentioned depolarizing effect but, nevertheless, will reverse the sense of the rotation of the plane of polarization of the system. Fig. 3 is intended to show this condition. While some points, such as points $a$, $f$, $q$, and $e$ in quadrant A of Fig. 2, having substantially zero deviation will appear substantially unchanged in Fig. 3, other points in Fig. 2 having varying amounts of depolarization will be reversed or deviated by like varying amounts but to the opposite side of the plane of polarization P by the half-wave plate.

Thus, certain arrows which sloped outwardly in Fig. 2, now slope inwardly in Fig. 3; even though other arrows in both figures apear unchanged. For example, while point $c$ in all quadrants in Fig. 3 will be angularly deviated approximately 9.6 degrees, in quadrants A and C its sign will be negative and in quadrants B and D its sign will be positive. This is the reverse of Fig. 2. The reversal provided by the half-wave plate alone, thus, will not provide any more workable arrangement than before; stray light will still continue to get through the system and limit the usefulness or resolving power of the instrument.

In addition to the use of phase retardation means 50, the improved optical system of Fig. 1 has been provided with rotation compensation means. The purpose of such compensation means is to rotate the plane of polarization of the improved system equipped with the half-wave plate or the like by an angular amount which is substantially equal to the rotation given the system initially by the sloping and other refracting surfaces thereof; so that in the final analysis, substantially plane polarized light, instead of light with various planes of polarization, will be received and blocked out by the analyzer of the system even at high numerical apertures.

Thus, in Fig. 1, it may be seen that the amount of rotation provided the system by the first condenser 18 and first auxiliary lens system 42 is substantially the equivalent of the amount of rotation provided by the auxiliary lens system 44, in effect, functioning as a condenser for illuminating objects at plane 32, and the objective 26 aligned therewith for forming images of these objects at conjugate image plane 28.

One could then consider the combined system of Fig. 1 as if parts 18 and 42 rotated the plane of polarization substantially to the position shown in Fig. 2, that the birefringent plate 50 receiving this rotated polarized light reversed its sense as indicated in Fig. 3 and that while this light passes through the auxiliary lens system 44 and objective 26 (having sloping surfaces substantially equivalent to those of parts 18 and 42) it is additionally rotated thereby in amounts which will be equal to that initially introduced rotation due to parts 18 and 42. For an even better balance of the rotation contributed by the parts above and below the plate 50, it may be advisable to insert at the plane 24 plates which will, in effect, equal the rotation effect caused by slide 34 and cover glass 36.

Figure 4:
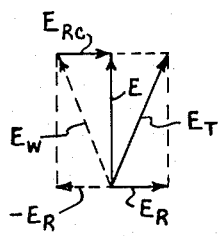
Fig. 4 is a vector diagram for use in explaining the improved condition which is accomplished by the optical system of Fig. 1.

If any point of the image field, such as point c in quadrant A in Fig. 2, where the initially introduced error of polarization is appreciable is now individually graphically considered, its direction and amplitude may be represented vectorily (see Fig. 4) by vector $E_T$. This wrongly directed polarized light $E_T$ is the resultant of the amplitude of the correctly directed polarized component E and the incorrectly directed component $E_R$ contributed by the refractive surfaces of the condenser 18, objective 42 and other transmitting surfaces ahead of the plate 50. However, the half-way plate 50 inserted in the system will, due to its retardational effect upon the ordinary and extraordinary components of the light intercepted thereby, reverse the sign of the incorrectly directed component, and thus act in the opposite direction, as indicted at $-E_R$, and a new resultant $-E_W$ will thus be provided. The vector $E_{RC}$ provided by the rotation compensation effect of parts 44 and 26, however, will add to vector $-E_W$ and since $E_{RC}$ acts in the same direction in which $E_R$ acts, it will have the effect of returning the plane of polarization substantially back to the position occupied by vector E. Thus, the resultant will act as plane polarized light.

The improved system may be considered in a converse maner also. In such a case, it could be approached from the standpoint that the condenser system 44 and the objective 26 together with the plane refracting surfaces therebetween act as the polarization rotation introducing parts of the instrument, that the half-way plate 50 is used to reverse the rotation effect, and that the first condenser 18 and auxiliary lens system 42 act together to introduce the necessary amounts of rotation compensation required to balance the system. In either case, of course, the arrangement should be such that the surfaces contributing the rotation and contributing the compensation therefor should be such as to balance out the effects of each other when the half-wave plate is used.

In Fig. 1, it is preferred to place the object at the transverse plane 32 rather than the transverse plane 24, since in such cases only the optical elements of the system appearing thereafter will then need to be highly corrected for the usual aberrations of a well corrected image-forming system.

In order to have the half-wave plate 50 act in its most efficient manner, it is preferable that the light passing therethrough be as near normal incidence relative thereto as possible, although slight convergence or divergence in the intercepted beam might be tolerated. The reason for this is that only at normal incidence will such a plate provide a half-wave differential between the two vibrational components of the polarized light transmitted thereby. For example, it would not be advisable to attempt to use the plate 50 in a conventional polarizing microscope system at or adjacent the object plane in the hopes that the depolarization due to the condenser elements would be compensated for by the objective after reversal by the half-wave plate and that the system could be used at relatively high numerical apertures. Generally speaking, it is preferable to avoid angles of incidence greater than a few degrees.

Plate 50 may be arranged to tilt slightly about a transverse axis such as that indicated at 54 in Fig. 1 where minor adjustments are desirable for obtaining an exact half wavelength differential between the vibrational components passing therethrough.

While a half wavelength plate is preferred in the improved optical system of the present invention, other thicker wavelength plates providing similar out-of-phase relationships, such as 1½λ, 2½λ etc. may be used.

Figure 5:
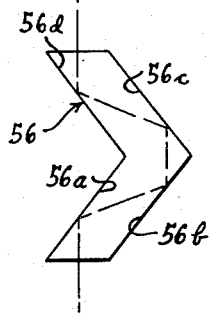
Fig. 5 is a side elevational view, at a somewhat reduced scale, of a modified form of half wave phase retardation device which may be used in the optical system of Fig. 1.

If white light is to be used instead of monochromatic light, a pair of doubly internally reflecting strain-free Fresnel rhombs or a single Fresnel rhomb having four internal reflections, each giving a one-eighth wave differential phase retardation, may be used as the half wave phase altering means in place of the half-wave plates mentioned above. Such a four-reflection rhomb is shown at 56 in Fig. 5; and it will be readily appreciated that since one-eighth of a wave phase change occurs at each internal reflection surface 56a, 56b, 56c and 56d, together these surfaces will provide a full one-half wave phase change between vibrational components disposed in planes at right angles to each other. The advantage of this device, of course, lies in the fact that it is much more achromatic since all wavelengths of white light are affected in substantially like manner. Here again, it is preferable to use the phase altering means in as near parallel light as possible.

Figure 6:
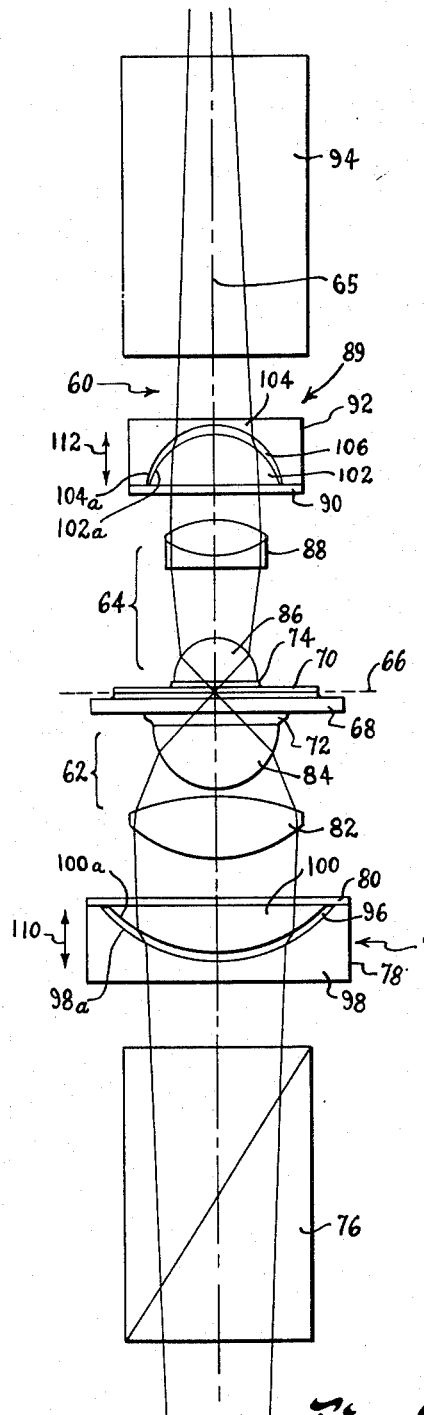
Fig. 6 is a schematic view of a polarizing microscope optical system, or the like, embodying a modified form of the present invention.

Referring now to Fig. 6, it will be seen that a modified form of polarizing microscope optical system is generally indicated by the numeral 60 and comprises a condenser 62 and objective 64 disposed in spaced relation to each other along a common optical axis 65 so as to be at opposite sides of and in operative relation to an object plane 66 of the system. Adjacent the object plane 66 is shown a conventional microscope slide 68 and cover glass 70. Both the condenser 62 and the objective 64, as shown, are being used as oil immersion optics as indicated at 72 and 74 respectively.

Light from an external source entering the optical system for illumination purposes passes through a polarizing prism, such as a Nicol prism or the like, 76. The polarized light rays leaving this prism first pass through light-modifying means 77 including rotation compensation means 78 and half wave plate 80 before being directed and concentrated by the refractive elements 82 and 84 of the condenser 62 at the object plane 66. While the preferred type of half wave phase retardation means is a birefringent half-wave plate, such as shown at 50 in Fig. 1, other types are known and have been described above.

On the other hand, light rays illuminating an object on the slide 68 and passing beyond the object plane 66 are collected by the refractive components 86 and 88 of the objective 64 and, after passing through light-modifying means 89 and an analyzer 94, are brought to a focus at a conjugate image plane (not shown) of the system. The light-modifying means 89 includes a half wave phase plate 90 and rotation compensation means 92. The analyzer 94 is in the form of a polarizing prism, such as a Nicol prism or the like, arranged in crossed relation relative to the polarizer 76.

As pointed out above relative to Fig. 1, curved surfaces of the condenser and objective lens elements of a polarizing microscope optical system as well as other light-transmitting elements thereof having surfaces receiving polarized light at various sloping angles of incidence act in varying degrees as partial polarizers, and tend to lower the extinction coefficient of such an optical system by tending accumulatively to rotate the plane of polarization of the light at each additional sloping light-transmitting surface thereof. Accordingly, complete extinction at the back aperture of the objective of the system of all of the light transmitted by the polarizer could not heretofore be obtained (even when strain-free optics and monochromatic light were employed).

In Fig. 1, rotation compensation means of carefully predetermined optical properties have been provided at 18 and 42, and if need be at 24 also, for the purpose of introducing a rotation effect which is, in effect, a substantial equivalent of the inherent rotation effect produced by the sloping and other refracting optical surfaces of the microscope system indicated by condenser 44, objective 26 and element 34, 36, and between these two major parts of the combined optical system, the half wave plate 50 has been inserted for reversing the sense of the rotation effect of one part relative to the other. In this manner, the two substantially equal effects cancelled out each other with the result that only substantially plane polarized light reaches the analyzer of the system.

The rotation compensation means (18 and 42) of Fig. 1, however, is quite sizeable as well as quite difficult and expensive to make; being, in so many words, a substantially complete additional condenser and objective microscope system arranged to function with the usual condenser and objective of the instrument. It has been found, however, that instead of this rather elaborate and expensive arrangement of optical components, a substantialy equivalent rotation compensation effect may be obtained by the use of a no-power, or substantially no-power, meniscus lens means when of proper predetermined optical characteristics and when disposed in a proper location in such optical system. For example, this type of rotation compensation means for compensating the condenser portion only of the system of Fig. 6 may be provided by component 78. This component, it will be seen, is in the form of a no-power meniscus comprising an air lens 96 enclosed between a plano-concave first refractive element 98 and a plano-convex second refractive element 100.

It will be readily appreciated that in such an arrangement an interface 98a is formed between the air lens 96 and the element 98, and that a second interface 100a is formed between the air lens 96 and component 100, and that both of these interfaces have the polarized light rays incident thereon impinging at various and different angles relative thereto. Thus, these polarized light rays are differently affected insofar as the depolarization of the light passing therethrough is concerned. The light rays near the center are received at nearly normal incidence, while the light rays nearer the outer edges are received at relatively higher angles of incidence. Thus, different unit areas of these refractive surfaces will differently affect the ordinary and extrordinary components of the polarizing light vibrating in the plane of incidence and vibrating in a plane normal thereto, and together a rotation effect can be produced to compensate the condenser portion of the system; thereby placing plane polarized light at the object plane 66. On the other hand, since the curved interfaces are substantially or nearly parallel to each other and the front and back plano surfaces of compensating means 78 are likewise substantially parallel to each other, no appreciable change in magnification will be produced.

In like manner, the previously mentioned rotation compensation means 92 for compensating the objective portion of the microscope system may be formed by a first plano-convex refractive element 102 and a second plano-concave refractive element 104 which together serve to form an air lens 106 therebetween. The interface 102a formed between element 102 and air lens 106 and the interface 104a formed between the air lens and element 104, are of such curvature that they will be substantially parallel to each other. The front and back plano surfaces of the elements 102 and 104, respectively, are likewise substantially parallel to each other, so that together these elements 102 and 104 with air lens 106 therebetween serve to modify or compensate the vibrational components of the polarized light rays transmitted thereby without producing any appreciable change in magnification in the image at the image plane of the objective.

Thus, the curvature of the air lens 96 in the lower part of the system is made of such a value as to provide a rotation effect which is substantially equal to the inherent rotation effect contributed by the condenser and the refractive optical elements between the prism 76 and the object plane 66. In a similar way, the curvature of the air lens 106 is made to substantially offset the rotation effect contributed by the objective and other optical surfaces between the object plane 66 and the analyzer 94. Slight changes in curvature of either of these air lenses may be used to increase or decrease the rotation effect produced thereby so as to more nearly fully and completely compensate for the said inherent rotation effect being cared for. Increasing or decreasing the curvature of the air lens 96, or 106, can be made to have a large influence on the amount of rotation being contributed by means 78, or by means 92.

It is interesting to note that since the parts of the beam of light being transmitted by the outer parts of the condenser elements and objective elements, are, in fact, the parts of the polarized beam suffering the greatest amounts from rotation, these parts are rightly or ideally positioned so as to pass also through outer parts of the air lenses as well for compensation thereby. On the other hand, fortunately, the more nearly centrally located rays are less affected and also less compensated by the improved compensation means. In this way, part 78 (or part 92) functioning with half wave phase retardation means 80 (or 90), as the case may be, will normally produce only substantially plane polarized light at the object plane 66 (or at analyzer 94); and this will be so even though no material change in magnification may be produced by either rotation compensation means.

As stated above, the curvature of either air lens in Fig. 6 may be made larger or smaller when attempting to obtain the proper balance insofar as rotation compensation is concerned. A very slight change or adjustment, however, for the condenser system may be obtained by slight axial movement of the compensation means 78, as indicated by the arrow 110. An equivalent slight change or adjustment for the objective system may be had by slight axial movement of the compensation means 92, as indicated by the arrow 112, and these adjustments are possible because of the slight convergence of the light beams being transmitted thereby.

While air lens 96 has its concave side facing upwardly, such is not of material importance, for a substantially equivalent rotation compensation effect would be likewise produced in cases in which this air lens is arranged to face downwardly. (The same sort of a condition is also true insofar as the orientation of air lens 106 is concerned.)

In the polarizing optical system of Fig. 6, polarized light from the prism 76 is rotationally modified a predetermined amount by compensation means 78, has its sense reversed by the half-wave plate 80, and then this light is again modified by the condenser and other associated optical elements of the instrument so that at the object plane 66, substantially plane polarized light is produced for illumination of objects on slide 68. If no object is present in the object field, this plane polarized light, in passing beyond the object plane 66, is then rotationally modified by the objective and associated elements of the optical system above the plane 66, has its sense reversed, by the half-wave plate 90 and then is again modified by an equivalent amount by compensation means 92 so that only substantially plane polarized light is received by the analyzer 94. Since the analyzer 94 will block out all plane polarized light, the image field or back aperture of the objective will at such times appear dark. However, if a birefringent object is placed in the object field of the objective 64, the object will differentially affect or rotate the polarized light impinging thereon with the result that the light reaching the analyzer 94 will be altered and parts of the object will be visible at the image plane of the instrument.

In the optical arrangement just described relative to Fig. 6, plane polarized light has been provided at the object plane 66. While such an arrangement is preferred, it should be pointed out, nevertheless, that the light-modifying means 77 including rotation compensation means 78 and half wave phase retardation means 80 could be omitted from the system, if desired, and still fairly acceptable results could be obtained in images at the back aperture of the objective 64 by merely using light-modifying means 89. This would be so even though the light illuminating an object at object plane 66 might be slightly depolarized light, depolarized by the sloping lens surfaces of the condenser and associated refracting optical elements of the first half of the system. Of course, in such an arrangement, the light received by the analyzer 94 would be only partially compensated. Better results will be obtained in such an arrangement if the rotation characteristics of the light-modifying means 89 are made larger and sufficient to substantially equal the combined depolarizing characteristics of the condenser 62, objective 64 and refractive optical elements therebetween combined. In this case, even though slightly depolarized light is present at the object plane 66 for object illumination purposes, substantially plane polarized light will be directed into the analyzer, unless altered by objects in object field. A more or less converse arrangement of light-modifying means might as readily be employed with acceptable results. In such a case, only a light-modifying means would be used between the polarizer 76 and condenser system 62 and would preferably have such rotation properties as to substantially completely compensate for the rotation characteristics of the condenser, objective and refracting optical elements therebetween.

However, as stated above, the separate compensation of the condenser and of the objective of an instrument is preferred. For example, when the objective and condenser are separately compensated, it would be possible to provide a plurality of interchangeable objectives on a turret together with their respective rotation compensating means, in a manner somewhat similar to that employed and well known in microscopy for parfocalized objectives. Another reason for this separate rotation compensation, is that only birefringent objects will be seen if only plane polarized light is present at the object plane 66 for illuminating the specimens; otherwise minute objects in the partially depolarized light at the object field might diffract some light along a new and incorrectly compensated path and this diffracted light would not then be a true indication of the birefringence of the objects. It follows also that intensity measurements can be made more correctly if the light at the object plane is only plane polarized light.

Figure 7:
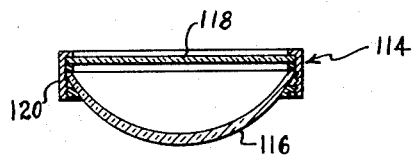
Fig. 7 is a sectional view of a modified form of rotation compensation means which may be employed in the optical system of Fig. 6.

In Fig. 7 is shown a modified form of light-modifying means 114. This means includes rotation compensation means 116 and half wave plate 118 arranged in assembled relation to each other; both being held in relative operative relation by means of a strain-free mount 120. The lens means 116 in this instance differs, however, from air lens means shown at 96, or 106, in Fig. 6 in that this means 116 is made of a glass or plastic notwithstanding the fact that it is still a substantially no-power meniscus lens. When such a lens 116 is of proper size and concave curvature to have the correct predetermined optical characteristics, it may be substituted in the optical system of Fig. 6 in place of the rotation compensation 78, or in place of the rotation compensation means 92 as the case may be. Of course, in either case the half wave plate 80, or 90, of necessity must be disposed between the substantially no-power lens and the usual optical components of the condenser, or of the objective of the device. Either its concave or convex side may be located next to or adjacent the plate with substantially equivalent results.

Figure 8:
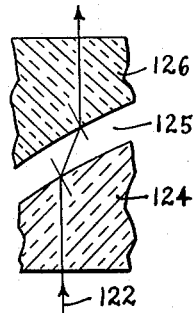
Figs. 8 and 9 are enlarged fragmentary sectional views of corresponding refractive portions of the improved rotation compensation means of Figs. 6 and 7 respectively.
Figure 9:
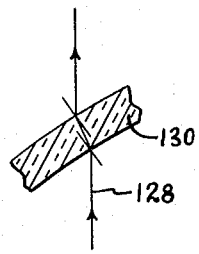

It might be well to note, at this point, that, from a practical standpoint, the no-power air lens type of rotation compensation means is preferred slightly over the glass or plastic type. This can be readily appreciated from a consideration of Figs. 8 and 9, and the discussion which follows. If it is imagined that Fig. 8 shows a small section taken through a rotation compensation means somewhat like that shown at 92 of Fig. 6, and that Fig. 9 shows a similar small section taken through a no-power glass meniscus type of rotation compensation means intended to be substituted therefor, it will be readily appreciated that a light ray, such as the ray indicated at 122 in Fig. 8, will have a larger angle of refraction upon entering the air space 125 between the elements 124 and 126 than would a similar ray 128 in Fig. 9 being refracted into the glass element 130 due to differences in refractive indices. Therefore, in order to obtain an equivalent depolarizing effect at the sloping surfaces of the glass compensator, it will be necessary to more steeply slope this part of the lens. Or, stated in different language, it would be necessary to make the no-power glass compensating lens means with much more steeply sloping surfaces near its outer edges than would be required in the no-power air lens having equivalent characteristics; and, of course, either the glass lens or plastic with steeply sloping outer portions would be much more difficult to make with optical accuracy than would be the glass elements 124 and 126 of Fig. 8.

Figure 10:
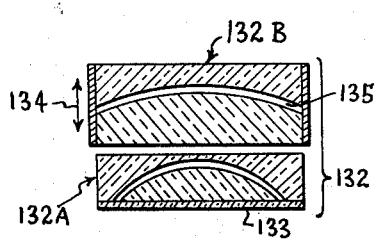
Figs. 10 and 11 are sectional views of modifications of rotation compensation means which may be employed in the optical system of Fig. 6.

In Fig. 10, a modified rotation compensation means is shown at 132. This means differs from that appearing at 92 in Fig. 6 mainly in that it is, in effect, divided into two parts or compensators 132A and 132B which jointly provide the amount of rotation effect desired, each providing a substantially no-power air lens between the spaced refracting elements thereof and the former 132A having a birefringent half-wave plate 133 attached thereto. However, the part 132B provides less of a rotation effect since it is formed with a less steeply curved air lens 135, and for this reason, this part would probably be more useful or desirable in a vernier fashion for axial adjustment, as indicated by arrow 134, for proper balancing of a polarizing optical system or the part of such a system for which it is intended.

Figure 11:
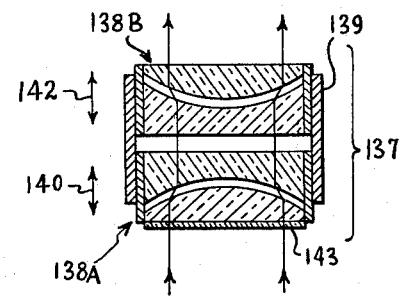

In Fig. 11 another modified form of rotation compensation means is indicated at 137 and comprises two main parts 138A and 138B providing oppositely facing air lenses therein. Their rotation effect, likewise would be accumulative. In this arrangement, it might be desirable to adjust either or both parts axially relative to a collar 139 as indicated by arrows 140 and 142 in parallel or nearly parallel light when obtaining proper balance in an associated polarizing optical system. Adjustment of either of these two parts would give no appreciable change in image magnification if used on the objective side of the system. A birefringent half-wave plate is indicated at 143. Of course, basically similar means could be used on the condenser side of the system as well, when of proper optical design to compensate same. A pair of no-power glass lenses or a pair of no-power plastic lenses could be likewise used for compensation purposes if desired in a manner similar to the air lenses suggested in Figs. 10 and 11. When desired, more than one or two air lenses, or glass lenses, or plastic lenses could be employed to accumulatively give in the optical system of Fig. 6, or the like, the compensating depolarization effect required, and such could be arranged to give no appreciable change in image magnification or nearly no change, as required.

Figure 12:
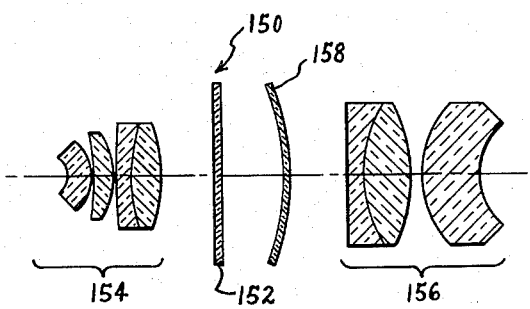
Fig. 12 is a polarizing microscope objective optical system made in accordance with the present invention.

In Fig. 12, there is shown at 150 a microscope objective of relative very high magnification, such as might be used for medical and research purposes, and this objective is arranged for use with plane polarized light at the associated object field. In keeping with the principles of the present invention, this objective is provided with phase altering means in the form of a half-wave plate 152 positioned in the nearly parallel light between a front group of refracting components 154 and a rear group of refracting components 156. This half-wave plate serves the purpose of reversing the sense of the partially rotationally modified light proceeding from the front group 154 and, accordingly, when careful consideration of this rotation effect relative to the similar effect which will be provided by the rear group 156, it is possible to provide a substantially complete rotation compensation condition for this objective lens system. Of course, if a field lens (not shown) were to be also used with such an objective near the image plane thereof its rotation effect should be considered together with that of the rear group for arriving at a best balance or rotation compensating arrangement. At 158 additionally is shown a no-power, or substantially no-power, element of a weak curvature which at times might be desirable with the rear group for securing a better balance of the entire system. Alternatively, such an element 158 might be more useful when used with the front group.

In any of the disclosed arrangements wherein the half-wave plate 50, 80, 90, 118, 133, 143, or 152 is or can be spaced somewhat from the associated rotation compensation means, it might be arranged for tilting slightly relative to the optical axis of the instrument.

While the amount or degrees of rotational effect can be reduced by using a low reflection coating on each surface, it is well to note also that rotation may be increased by non-metallic high reflection coatings. Such knowledge may be of aid at times in obtaining a closer match or balance between the rotation effects of a specific system and the rotation compensation means therefor.

While a conventional polarizing microscope operating efficiently at a numerical aperture of approximately .84 possessed, as pointed out above, 9.6 degrees of rotation at locations c in the four quadrants in Fig. 2, in corresponding locations c of the object field of an improved polarizing optical system like that indicated in Fig. 6 and embodying the present invention, this 9.6 degrees of rotation has been reduced to a maximum of approximately 0.10 of a degree of rotation. Thus, the resolving power of the present improved polarizing optical system has been greatly increased.

While in the preceding description reference has been made to the polarizer and analyzer being arranged in crossed relation to each other (and with an axis of the phase plate or phase-altering means at the same time being in parallel relation to the plane of the polarizer), it should be noted that this crossed relation refers to their relation in an optical sense rather than in a geometric sense; that is with the analyzer set to extinguish light which impinges thereon. For example, it is possible to obtain acceptable results in a case wherein the axis of the half-wave plate is not exactly parallel to the plane of the polarizer and in such a case the best adjustment would be with the axis of the half-wave plate, in effect, at an angle intermediate or angularly half way between the plane of the polarizer and the plane of the analyzer.

Having described our invention, we claim:

1. A polarizing optical system having a relatively large numerical aperture and comprising a condenser and an objective each employing refracting components, said condenser and objective being disposed in spaced optically aligned relation to each other along a common optical axis, and at opposite sides of a predetermined object plane of said system, a polarizer and an analyzer in optically crossed relation to each other in said optical system and positioned at opposite sides, respectively, of said condenser and objective combined, said polarizer being arranged to receive light from a source of illumination and to direct same as a beam of polarized light toward said condenser and said predetermined object plane, for illuminating objects at said object plane, said objective being arranged to focus at said predetermined object plane while forming an image thereof at an image plane conjugate thereto, refractive rotation compensation means in said optical system at one side of said condenser and objective combined, said condenser and objective jointly possessing inherent rotational characteristics of a predetermined value tending to rotate the plane of polarization of said polarized light, said rotation compensation means having rotational characteristics also tending to rotate the plane of polarization of the polarized light received thereby and which characteristics are substantially equal to the rotational characteristics of said objective and condenser combined, and phase-altering means so disposed and oriented in said optical system between said condenser and objective combined and said rotation compensation means as to be in nearly parallel light and with one of its axes in substantially parallel relation to the axis of polarization of said polarizer, said phase-altering means having such predetermined optical characteristics as to introduce into light rays being transmitted therethrough substantially a one-half wavelength differential phase retardation between a vibrational component thereof vibrating in a first plane and a vibrational component thereof vibrating in a second plane at right angles thereto, said phase-altering means serving to reverse the sense of the partially rotated light of said system being received thereby, whereby the amount of rotation of the plane of polarization provided by the objective and condenser combined will be substantially offset by the amount of rotation of the plane of polarization of opposite sense being provided by said rotation compensation means, with the result that substantially all of the light being received by the analyzer of said system will be substantially plane polarized light unless altered by objects at said object plane.

2. A polarizing optical system having a relatively large numerical aperture and comprising a condenser and an objective each employing refractive components, said condenser and objective being disposed in spaced optically aligned relation to each other along a common optical axis, and at opposite sides of a predetermined object plane of said system, polarizing means and analyzing means in optically crossed relation to each other and positioned at opposite sides, respectively, of said condenser and objective combined, said polarizing means being arranged to receive light from a light source and to direct same as a beam of polarized light toward said condenser and said predetermined object plane, said objective being arranged to focus at said predetermined object plane while forming an image thereof at an image plane conjugate thereto, rotation compensation means in said optical system between said condenser and objective combined and one of said polarizing and analyzing means, said rotation compensation means being in the form of at least one substantially no-power refracting optical component having a pair of adjacent curved surfaces, one of said surfaces being a convex surface of predetermined curvature and the other being a concave surface of substantially similar curvature, said condenser and objective in normal use in said optical system jointly having inherent rotational characteristics of a predetermined value tending to rotate the plane of polarization of said polarized light, said rotation compensation means having rotational characteristics also tending to rotate the plane of polarization of the polarized light received thereby and which characteristics are substantially equal to said inherent rotational characteristics of said condenser and objective combined, and phase-altering means so disposed and oriented in said optical system between said condenser and objective combined and said rotation compensation means as to be in nearly parallel light and with one of its axes in substantially parallel relation to the axis of polarization of said polarizer, said phase-altering means having such predetermined optical characteristics as to introduce into light rays being transmitted therethrough substantially a one-half wavelength differential phase retardation between a vibrational component thereof vibrating in a first plane and a vibrational component thereof vibrating in a second plane at right angles thereto, said phase-altering means serving to reverse the sense of the partially rotated light being received thereby, whereby the amount of rotation of the plane of polarization provided by the objective and condenser combined in said system will be substantially compensated by the amount of rotation of the plane of polarization of opposite sense being provided by said rotation compensation means, with the result that substantially all of the light being received by said analyzing means will be substantially plane polarized light unless altered by objects at said object plane.

3. A polarizing optical system having a relatively large numerical aperture and comprising a condenser and an objective each employing refractive components, said condenser and objective being disposed in spaced optically aligned relation to each other along a common optical axis, and at opposite sides of a predetermined object plane of said system, a polarizer and an analyzer in optically crossed relation to each other in said optical system and positioned at opposite sides, respectively, of said condenser and objective combined, said polarizer being arranged to receive light from a source of illumination and to direct same as a beam of polarized light toward said condenser and said predetermined object plane, for illuminating objects at said object plane, said objective being arranged to focus at said predetermined object plane while forming an image thereof at an image plane conjugate thereto, refractive rotation compensation means in said optical system at one side of said condenser and objective combined, said condenser and objective jointly possessing inherent rotational characteristics of a predetermined value tending to rotate the plane of polarization of said polarized light, said rotation compensation means having rotational characteristics also tending to rotate the plane of polarization of the polarized light received thereby and which characteristics are substantially equal to said inherent rotational characteristics of said objective and condenser combined, and a birefringent half-wave plate so disposed and oriented in said optical system between said condenser and objective combined and said rotation compensation means as to be in nearly parallel light and with one of its axes in substantially parallel relation to the axis of polarization of said polarizer, and serving to reverse the sense of the partially rotated light of said system being received thereby, whereby the amount of rotation of the plane of polarization provided by the objective and condenser combined will be substantially compensated by the amount of rotation of the plane of polarization of opposite sense being provided by said rotation compensation means, with the result that substantially all of the light being received by the analyzer of said system will be substantially plane polarized light unless altered by objects at said object plane.

4. A polarizing optical system having a relatively large numerical aperture and comprising a condenser and an objective each employing refractive components, said condenser and objective being disposed in spaced optically aligned relation to each other along a common optical axis, and at opposite sides of a predetermined object plane of said system, polarizing means and analyzing means in optically crossed relation to each other and positioned at opposite sides, respectively, of said condenser and objective combined, said polarizing means being arranged to receive light from a light source and to direct same as a beam of polarized light toward said condenser and said predetermined object plane, said objective being arranged to focus at said predetermined object plane while forming an image thereof at an image plane conjugate thereto, rotation compensation means in said optical system between said condenser and objective combined and said analyzing means, said rotation compensation means being in the form of at least one substantially no-power refractive optical component having a pair of adjacent curved surfaces, one of said surfaces being a convex surface of predetermined curvature and the other being a concave surface of substantially similar curvature, said condenser and objective in normal use in said optical system jointly having inherent rotational characteristics of a predetermined value tending to rotate the plane of polarization of said polarized light, said rotation compensation means having rotational characteristics also tending to rotate the plane of polarization of the polarized light received thereby and which characteristics are substantially equal to said inherent rotational characteristics of said condenser and objective combined, and phase-altering means so disposed and oriented in said optical system between said condenser and objective combined and said rotation compensation means as to be in nearly parallel light and with one of its axes in substantially parallel relation to the axis of polarization of said polarizer, said phase-altering means having such predetermined optical characteristics as to introduce into light rays being transmitted therethrough substantially a one-half wavelength differential phase retardation between a vibrational component thereof vibrating in a first plane and a vibrational component thereof vibrating in a second plane at right angles thereto, said phase-altering means serving to reverse the sense of the partially rotated light being received thereby, whereby the amount of rotation of the plane of polarization provided by the objective and condenser combined in said system will be substantially compensated by the amount of rotation of the plane of polarization of opposite sense being provided by said rotation compensation means, with the result that substantially all of the light being received by said analyzing means will be substantially plane polarized light unless altered by objects at said object plane.

5. A polarizing optical system having a relatively large numerical aperture and comprising a condenser and an objective each employing refractive components, said condenser and objective being disposed in spaced optically aligned relation to each other along a common optical axis, and at opposite sides of a predetermined object plane of said system, a polarizer and an analyzer in optically crossed relation to each other in said optical system and positioned at opposite sides, respectively, of said condenser and objective combined, said polarizer being arranged to receive light from a source of illumination and to direct same as a beam of polarized light toward said condenser and said predetermined object plane, for illuminating objects at said object plane, said objective being arranged to focus at said predetermined object plane while forming an image thereof at an image plane conjugate thereto, refractive rotation compensation means in said optical system at one side of said condenser and objective combined, said condenser and objective jointly possessing inherent rotational characteristics of a predetermined value tending to rotate the plane of polarization of said polarized light, said rotation compensation means having rotational characteristics also tending to rotate the plane of polarization of the polarized light received thereby and which characteristics are substantially equal to said inherent rotational characteristics of said objective and condenser combined, and multiple reflection phase-changing means so disposed in said optical system as to be in nearly parallel light between said condenser and objective combined and said rotation compensation means and having such predetermined optical characteristics as to introduce into light rays being transmitted thereby substantially a one-half wavelength differential phase retardation between a vibrational component thereof vibrating in a first plane and a vibrational component thereof vibrating in a second plane at right angles thereto, said phase-changing means being so oriented in said system as to have one of said planes of vibration in substantially parallel relation to the plane of polarization of said polarizer, and serving to reverse the sense of the partially rotated light of said system being received thereby, whereby the amount of rotation of the plane of polarization provided by the objective and condenser combined will be substantially compensated by the amount of rotation of the plane of polarization of opposite sense being provided by said rotation compensation means, with the result that substantially all of the light being received by the analyzer of said system will be substantially plane polarized light unless altered by objects at said object plane.

6. A polarizing optical system having a relatively large numerical aperture and comprising a condenser and an objective each employing refractive components, said condenser and objective being disposed in spaced optically aligned relation to each other along a common optical axis, and at opposite sides of a predetermined object plane of said system, a polarizer and an analyzer in optically crossed relation to each other in said optical system and positioned at opposite sides, respectively, of said condenser and objective combined, said polarizer being arranged to receive light from a source of illumination and to direct same as a beam of polarized light toward said condenser and said predetermined object plane, for illuminating objects at said object plane, said objective being arranged to focus at said predetermined object plane while forming an image thereof at an image plane conjugate thereto, refractive rotation compensation means in said optical system at one side of said condenser and objective combined, said condenser and objective jointly possessing inherent rotational characteristics of a predetermined value tending to rotate the plane of polarization of said polarized light, said rotation compensation means having rotational characteristics also tending to rotate the plane of polarization of the polarized light received thereby and comprising light-transmitting refractive optical elements intercepting the light passing through the system at varying angles of incidence ranging from zero adjacent the optical axis to angles of incidences of substantial magnitude at the outer edges thereof so as to substantially equal the said inherent rotational characteristics of said objective and condenser combined and while contributing substantially no change in image magnification to said system, and phase-altering means so disposed in said optical system as to be in nearly parallel light between said condenser and objective combined and said rotation compensation means, said phase-altering means having such predetermined optical characteristics as to introduce into light rays being transmitted therethrough substantially a one-half wavelength differential phase retardation between a vibrational component thereof vibrating in a first plane and a vibrational component thereof vibrating in a second plane at right angles thereto, said phase-altering means being so oriented in said system as to have one of said planes of vibration in substantially parallel relation to the plane of polarization of said polarizer, and serving to reverse the sense of the partially rotated light of said system being received thereby, whereby the amount of rotation of the plane of polarization provided by the objective and condenser combined will be substantially compensated by the amount of rotation of the plane of polarization of opposite sense being provided by said rotation compensation means, with the result that substantially all of the light being received by the analyzer of the system will be substantially plane polarized light unless altered by objects at said object plane.

7. A polarizing optical system having a relatively large numerical aperture and comprising a condenser and an objective each employing refractive components, said condenser and objective being disposed in spaced optically aligned relation to each other along a common optical axis, and at opposite sides of a predetermined object plane of said system, polarizing means and analyzing means in optically crossed relation to each other and positioned at opposite sides, respectively, of said condenser and objective combined, said polarizing means being arranged to receive light from a light source and to direct same as a beam of polarized light toward said condenser and said predetermined object plane, said objective being arranged to focus at said predetermined object plane while forming an image thereof at an image plane conjugate thereto, rotation compensation means in said optical system between said condenser and objective combined and said analyzing means, said rotation compensation means being in the form of at least one substantially no-power refractive optical component having a pair of adjacent curved surfaces, one of said surfaces being a convex surface of predetermined curvature and the other being a concave surface of substantially similar curvature, said objective in said optical system having inherent rotational characteristics of a predetermined value tending to rotate the plane of polarization of polarized light received from said object plane, said rotation compensation means having rotational characteristics also tending to rotate the plane of polarization of the polarized light received thereby and which rotational characteristics are substantially equal to said inherent rotational characteristics of said objective, and phase-altering means so disposed in said optical system as to be in nearly parallel light between said condenser and objective combined and said rotation compensation means, said phase-altering means having such predetermined optical characteristics as to introduce into light rays being transmitted therethrough substantially a one-half wavelength differential phase retardation between a vibrational component thereof vibrating in a first plane and a vibrational component thereof vibrating in a second plane at right angles thereto, said phase-altering means being so oriented in said system as to have one of said planes of vibration in substantially parallel relation to the plane of polarization of said polarizer, and serving to reverse the sense of the partially rotated light being received from said objective, whereby the amount of rotation of the plane of polarization provided by the objective in said system will be substantially compensated by the amount of rotation of the plane of polarization of opposite sense being provided by said rotation compensation means, with the result that substantially all of the light being received by said analyzing means will be substantially plane polarized light unless altered by objects at said object plane.

8. Light-modifying apparatus for use in a conventional polarizing optical system having a relatively large numerical aperture and of the type employing a polarizer and condenser in optical alignment at one side of an object plane thereof and an objective and an analyzer in optical alignment at the other side thereof, said condenser and said objective combined having rotational characteristics of a predetermined value, said light-modifying apparatus comprising refractive rotation compensation means and phase altering means disposed in adjacent operative relation to each other and adapted to be inserted into said polarizing optical system in nearly parallel light between the polarizer and analyzer thereof and at one side of said condenser and objective combined, and with said phase-altering means disposed between said rotation compensation means and said condenser and objective combined, said rotation compensation means possessing rotational characteristics which are predetermined so as to be substantially equal to the inherent rotational characteristics of the refracting surfaces of said condenser and objective combined, said phase-altering means having such predetermined optical characteristics as to introduce into light rays being transmitted therethrough substantially a one-half wavelength differential phase retardation between a vibrational component thereof vibrating in a first plane and a vibrational component thereof vibrating in a second plane at right angles thereto, and arranged to be disposed with one of said planes of vibration in substantially parallel relation to the plane of polarization of said polarizer so as to serve as sense-reversing means when in use between said rotation compensation means and said condenser and objective combined in said polarizing optical system, whereby substantially all light being received by the analyzer of said system when said light-modifying apparatus is in operative position therein will be substantially plane polarized light unless altered by objects at the object plane of said system.

9. Light-modifying apparatus for use in a conventional polarizing optical system having a relatively large numerical aperture and of the type employing a polarizer and condenser in optical alignment at one side of an object plane thereof and an objective and an analyzer in optical alignment at the other side thereof, said condenser and said objective combined having rotational characteristics of a predetermined value, said light-modifying apparatus comprising refractive rotation compensation means and phase-altering means disposed in adjacent operative relation to each other and adapted to be inserted into said polarizing optical system in nearly parallel light between the polarizer and analyzer thereof and at one side of said condenser and objective combined, and with said phase-altering means disposed between said rotation compensation means and said condenser and objective combined, said rotation compensation means possessing rotational characteristics which are predetermined so as to be substantially equal to the inherent rotational characteristics of the refracting surfaces of said condenser and objective combined, said phase-altering means being in the form of a birefringent half-wave plate adapted to be disposed in said system with one of its axes in substantially parallel relation to the plane of polarization of said polarizer so as to serve as sense-reversing means when in use between said rotation compensation means and said condenser and objective combined in said polarizing optical system, whereby substantially all light being received by the analyzer of said system when said light-modifying apparatus is in operative position therein will be substantially plane polarized light unless altered by objects at the object plane of said system.

10. A polarizing optical system having a relatively high numerical aperture and comprising a condenser and an objective each employing refractive components, said condenser and objective being disposed in spaced optically aligned relation to each other along a common optical axis, and at opposite sides of a predetermined object plane of said system, polarizing means and analyzing means in optically crossed relation to each other and positioned at opposite sides, respectively, of said condenser and objective combined, said polarizing means being arranged to receive light from a light source and to direct same as a beam of polarized light toward said condenser and said predetermined object plane, said objective being arranged to focus at said predetermined object plane while forming an image thereof at an image plane conjugate thereto, rotation compensation means in said optical system between said condenser and objective combined and said polarizing means, said rotation compensation means being in the form of at least one substantially no-power refractive optical component having a pair of adjacent curved surfaces, one of said surfaces being a convex surface of predetermined curvature and the other being a concave surface of substantially similar curvature, said condenser and objective in said optical system jointly having inherent rotational characteristics of a predetermined value tending to rotate the plane of polarization of said polarized light, said rotation compensation means having rotational characteristics also tending to rotate the plane of polarization of the polarized light received thereby and which characteristics are substantially equal to said inherent rotational characteristics of said condenser and objective combined, and phase-altering means disposed in said optical system in nearly parallel light between said condenser and objective combined and said rotation compensation means, said phase-altering means having such predetermined optical characteristics as to introduce into light rays being transmitted therethrough substantially a one-half wavelength differential phase retardation between a vibrational component thereof vibrating in a first plane and a vibrational component thereof vibrating in a second plane at right angles thereto, said phase-altering means being disposed with one of said planes of vibration in substantially parallel relation to the plane of polarization of said polarizer and serving to reverse the sense of the partially rotated light being received thereby, whereby the amount of rotation of the plane of polarization provided by the objective and condenser combined in normal use in said system will be substantially compensated by the amount of rotation of the plane of polarization of opposite sense being provided by said rotation compensation means, with the result that substantially all of the light being received by said analyzing means will be substantially plane polarized light unless altered by objects of said object plane.

11. Light-modifying apparatus for use in a conventional polarizing optical system having a relatively high numerical aperture and of the type employing a polarizer and condenser in optical alignment at one side of an object plane thereof and an objective and an analyzer in optical alignment at the other side thereof, said condenser and said objective combined having rotational characteristics of a predetermined value, said light-modifying apparatus comprising refractive rotation compensation means and phase-altering means disposed in adjacent operative relation to each other and adapted to be inserted into said polarizing optical system in nearly parallel light between the polarizer and analyzer thereof and at one side of said condenser and objective combined, and with said phase-altering means disposed between said rotation compensation means and said condenser and objective combined, said rotation compensation means possessing rotational characteristics which are predetermined so as to be substantially equal to the inherent rotational characteristics of the refracting surfaces of said condenser and objective combined, said phase-altering means being in the form of multiple reflection phase-changing means and having such predetermined optical characteristics as to introduce into light rays being transmitted thereby substantially a one-half wavelength differential phase retardation between a vibrational component thereof vibrating in a first plane and a vibrational component thereof vibrating in a second plane at right angles thereto, said phase-changing means being adapted to be disposed in said system with one of said planes of vibration in substantially parallel relation to the plane of polarization of said polarizer so as to serve as sense-reversing means when in use between said rotation compensation means and said condenser and objective combined in said polarizing optical system, whereby substantially all light being received by the analyzer of said system when said light-modifying apparatus is in operative position therein will be substantially plane polarized light unless altered by objects at the object plane of said system.

12. A polarizing optical system having a relatively high numerical aperture and comprising a condenser and an objective each employing refractive components, said condenser and objective being disposed in spaced optically aligned relation to each other along a common optical axis, and at opposite sides of a predetermined object plane of said system, polarizing means and analyzing means in optically crossed relation to each other positioned at opposite sides, respectively, of said condenser and objective combined, said polarizing means being arranged to receive light from a light source and to direct same as a beam of polarized light toward said condenser and said predetermined object plane, said objective being arranged to focus at said predetermined object plane while forming an image thereof at an image plane conjugated thereto, first and second rotation compensation means in said optical system between said condenser and polarizing means and between said objective and said analyzing means, respectively, each of said rotation compensation means being in the form of at least one substantially no-power refractive optical component having a pair of adjacent curved surfaces, one of said surfaces being a convex surface of predetermined curvature and the other being a concave surface of substantially similar curvature, said condenser in said optical system having rotational characteristics of a predetermined value tending to rotate the plane of polarization of said polarized light at said object plane, said objective in said optical system having rotational characteristics of a predetermined value tending to rotate the plane of polarization of said polarized light traveling from said objective toward said analyzing means, said first rotation compensation means having rotational characteristics tending to rotate the plane of polarization of the polarized light received thereby which are substantially equal to the rotational characteristics of said condenser, said second rotation compensation means having rotational characteristics tending to rotate the plane of polarization of the polarized light received thereby which are substantially equal to the rotational characteristics of said objective, and first and second phase-altering means disposed in nearly parallel light in said optical system between said first rotation compensation means and said condenser and between said objective and said second rotation compensation means, respectively, each of said phase-altering means having such predetermined optical characteristics as to introduce into light rays being transmitted therethrough substantially a one-half wavelength differential phase retardation between a vibrational component thereof vibrating in a first plane and a vibrational component thereof vibrating in a second plane at right angles thereto, each of said phase-altering means being disposed with one of its planes of vibration in substantially parallel relation to the plane of polarization of the polarized light incident thereon and serving to reverse the sense of the partially rotated light being received thereby, whereby the amount of rotation of the plane of polarization provided by said condenser and provided by the objective in said system will be substantially compensated by the amount of rotation of the plane of polarization of opposite sense being provided by said first and second rotation compensation means, respectively, with the result that substantially all of the light at said object plane will be substantially plane polarized light, and substantially all of the light being received by said analyzing means will be substantially plane polarized light unless altered by objects at said object plane.

13. Light-modifying apparatus or use in a conventional polarizing optical system having a relatively high numerical aperture and of the type employing a polarizer and condenser in optical alignment at one side of an object plane thereof and objective and an analyzer in optical alignment at the other side thereof, said condenser and said objective combined having rotational characteristics of a predetermined value; said light-modifying apparatus comprising rotation compensation means and phase-altering means disposed in adjacent operative relation to each other and adapted to be inserted into said polarizing optical system in nearly parallel light between the polarizer and analyzer thereof and at one side of said condenser and objective means combined, and with said phase-altering means disposed between said rotation compensation means and said condenser and objective means combined, said rotation compensation means being in the form of at least one substantially no-power refracting optical component having a pair of adjacent curved surfaces, one of said surfaces being a convex surface of predetermined curvature and the other a concave surface of substantially similar curvature, said rotation compensation means possessing rotational characteristics which are predetermined so as to be substantaily equal to the inherent rotational characteristics of the refractive surfaces of said condenser and objective combined, said phase-altering means having such predetermined optical characteristics as to introduce into light rays being transmitted therethrough substantially a one-half wavelength differential phase retardation between a vibrational component thereof vibrating in a first plane and a vibrational component thereof vibrating in a second plane at right angles thereto, and arranged to be disposed with one of said planes of vibration in substantially parallel relation to the plane of polarization of said polarizer so as to serve as sense-reversing means when in use between said rotation compensation means and said condenser and objective means combined in said optical system.

14. Light-modifying apparatus for use in a conventional polarizing optical system having a relatively high numerical aperture and of the type employing a polarizer and condenser means in optical alignment at one side of an object plane thereof and objective means and an analyzer in optical alignment at the other side thereof, said condenser means and said objective means each having rotational characteristics of predetermined values, said light-modifying apparatus comprising rotation compensation means and phase-altering means disposed in adjacent operative relation to each other and adapted to be inserted into said polarizing optical system in nearly parallel light between the polarizer and analyzer thereof and at one side of said condenser and objective means combined, and with said phase-altering means disposed between said rotation compensation means and said condenser and objective means combined, said rotation compensation means being in the form of at least one substantially no-power refractive optical component having a pair of adjacent curved surfaces, one of said surfaces being a convex surface of predetermined curvature and the other a concave surface of substantially similar curvature, said rotation compensation means possessing rotational characteristics which are predetermined so as to be substantially equal to the inherent rotational characteristics of the refractive surfaces of a preselected one of said condenser and objective means, said phase-altering means having such predetermined optical characteristics as to introduce into light rays being transmitted therethrough substantially a one-half wavelength differential phase retardation between a vibrational component thereof vibrating in a first plane and a vibrational component thereof vibrating in a second plane at right angles thereto, and arranged to be disposed in said system with one of said planes of vibration in substantially parallel relation to the plane of polarization of the light incident thereon so as to serve as sense-reversing means when in use between said rotation compensation means and said preselected one of said condenser and objective means.

15. Light-modifying apparatus for use in a conventional polarizing optical system having a relatively large numerical aperture and of the type employing a polarizer and condenser means in optical alignment at one side of an object plane thereof and objective means and an analyzer in optical alignment at the other side thereof, said condenser means and said objective means each having rotational characteristics of predetermined values, said light-modifying apparatus comprising rotation compensation means and phase-altering means disposed in adjacent relation relative to each other and adapted to be inserted into said polarizing optical system in nearly parallel light between the polarizer and analyzer thereof and at one side of said condenser and objective means combined, and with said phase-altering means disposed between said rotation compensation means and said condenser and objective means combined, said rotation compensation means being in the form of a plurality of substantially no-power refractive optical components each having a pair of adjacent curved surfaces, one of said surfaces of each pair of surfaces being a convex surface of a predetermined curvature and the other a concave surface of substantially similar curvature, the plurality of pairs of curved surfaces of said rotation compensation means jointly possessing rotational characteristics which are predetermined so as to be substantially equal to the inherent rotational characteristics of the refractive surfaces of a pre-selected one of said condenser and objective means, said phase-altering means having such predetermined optical characteristics as to introduce into light rays being transmitted therethrough substantially a one-half wavelength differential phase retardation between a vibrational component thereof vibrating in a first plane and a vibrational component thereof vibrating in a second plane at right angles thereto, and arranged to be disposed in said system with one of said planes of vibration in substantially parallel relation to the plane of polarization of the light incident thereon so as to serve as sense-reversing means when in use between said rotation compensation means and said pre-selected one of said condenser and objective means in said optical system.

16. Light-modifying apparatus for use in a conventional polarizing optical system having a relatively large numerical aperture and of the type employing a polarizer and condenser means in optical alignment at one side of an object plane thereof and objective means and an analyzer in optical alignment at the other side thereof, said condenser means and said objective means each having rotational characteristics of predetermined values, said light-modifying apparatus comprising rotation compensation means and phase-altering means disposed in adjacent relation relative to each other and adapted to be inserted into said polarizing optical system in nearly parallel light between the polarizer and analyzer thereof and at one side of said condenser and objective means combined, and with said phase-altering means disposed between said rotation compensation means and said condenser and objective means combined, said rotation compensation means being in the form of a pair of substantially no-power refractive optical components each having a pair of adjacent curved surfaces, one of said surfaces of each pair of surfaces being a convex surface of predetermined curvature and the other a concave surface of substantially similar curvature, the curvature of one pair of surfaces being of an appreciably different magnitude than that of the other pair, the pairs of surfaces of said rotation compensation means jointly possessing rotational characteristics which are predetermined so as to be substantially equal to the inherent rotational characteristics of the refractive surfaces of a preselected one of said condenser and objective means, one rotation compensation means of said pair being axially adjustable relative to the other when in said system, said phase-altering means having such predetermined optical characteristics as to introduce into light rays being transmitted therethrough substantially a one-half wavelength differential phase retardation between a vibrational component thereof vibrating in a first plane and a vibrational component thereof vibrating in a second plane at right angles thereto, and arranged to be disposed in said system with one of said planes of vibration in substantially parallel relation to the plane of polarization of the light incident thereon so as to serve as sense-reversing means when in use between said rotation compensation means and said pre-selected one of said condenser and objective means in said system.

17. Light-modifying apparatus for use in a conventional polarizing optical system having a relatively high numerical aperture and of the type employing a polarizer and condenser means in optical alignment at one side of an object plane thereof and objective means and an analyzer in optical alignment at one side of an object plane thereof and objective means and an analyzer in optical alignment at the other side thereof, said condenser means and said objective means each having rotational characteristics of predetermined values, said light-modifying apparatus comprising rotation compensation means and phase-altering means disposed in adjacent relation relative to each other and adapted to be inserted into said polarizing optical system in nearly parallel light between the polarizer and analyzer thereof and at one side of said condenser and objective means combined, and with said phase-altering means disposed between said rotation compensation means and said condenser and objective means combined, said rotation compensation means being in the form of a pair of substantially no-power refractive optical components each having a pair of adjacent curved surfaces, one of said surfaces of each pair of surfaces being a convex surface of predetermined curvature and the other a concave surface of substantially similar curvature, the curvature of one pair of surfaces facing in an axial direction opposite to that of the other pair, said pairs of surfaces jointly possessing rotational characteristics which are predetermined so as to be substantially equal to the inherent rotational characteristics of the refractive surfaces of a pre-selected one of said condenser and objective means, said phase-altering means having such predetermined optical characteristics as to introduce into light rays being transmitted therethrough substantially a one-half wavelength differential phase retardation between a vibrational component thereof vibrating in a first plane and a vibrational component thereof vibrating in a second plane at right angles thereto, and arranged to be disposed in said system with one of said planes of vibration in substantially parallel relation to the plane of polarization of the light incident thereon so as to serve as sense-reversing means when in use in said system between said rotation compensation means and said pre-selected one of said condenser and objective means.

18. A polarizing image-forming optical system having a relatively large numerical aperture and comprising a polarizer arranged to receive light from a light source and to supply polarized light to said system, an analyzer disposed in optically crossed and spaced relation relative to said polarizer, a first group of refracting lens components and a second group of refracting lens components disposed in optically aligned relation to each other along a common optical axis, and positioned between said polarizer and analyzer so as to transmit polarized light from said polarizer to said analyzer, said first group of lens components being arranged to transmit nearly parallel light toward said second group of lens components, an object plane in said system between said polarizer and analyzer, said object plane being disposed at such a location relative to said first and second groups of refracting lens components that certain predetermined lens components thereof will be focused at said object plane and will form an image of said object plane at an image plane in conjugate relation thereto, said first and second groups of refracting lens components each having inherent rotational effect on the polarized light obliquely incident upon unit refracting surface areas thereof, the rotational effect produced by one of said groups of refracting lens components to the polarized light being transmitted thereby being predetermined so as to be substantially equal to the predetermined rotational effect produced by the other of said groups of refracting lens components to the polarized light being transmitted thereby, and phase-altering means disposed in said optical system in said nearly parallel light between said first and second groups of refracting lens components, said phase-altering means having such predetermined optical characteristics as to introduce into light rays being transmitted therethrough substantially a one-half wavelength differential phase retardation between a vibrational component thereof vibrating in a first plane and a vibrational component thereof vibrating in a second plane at right angles thereto, said phase-altering means being disposed in said system with one of its planes of vibration in substantially parallel relation to the plane of polarization of the polarized light incident thereon and serving to reverse the sense of the partially rotated light being received thereby, whereby substantially plane polarized light will be received by said analyzer unless altered by objects at said object plane.

References Cited in the file of this patent

UNITED STATES PATENTS 2,303,906    Benford et al. _____ Dec. 1, 1942

FOREIGN PATENTS 626,621    Great Britain _____ July 19, 1949